US012293707B2

(12) United States Patent
Jang et al.

(10) Patent No.: US 12,293,707 B2
(45) Date of Patent: May 6, 2025

(54) PIXEL CIRCUIT AND DISPLAY INCLUDING THE SAME

(71) Applicant: ADRC. CO. KR, Seoul (KR)

(72) Inventors: Jin Jang, Seoul (KR); Jun Hyuk Cheon, Seoul (KR); Junyeong Kim, Seoul (KR)

(73) Assignee: ADRC. CO. KR, Seoul (KR)

( * ) Notice: Subject to any disclaimer, the term of this patent is extended or adjusted under 35 U.S.C. 154(b) by 0 days.

(21) Appl. No.: 18/667,143

(22) Filed: May 17, 2024

(65) Prior Publication Data

US 2024/0420625 A1 Dec. 19, 2024

(30) Foreign Application Priority Data

Jun. 14, 2023 (KR) ........................ 10-2023-0076334

(51) Int. Cl.
*G09G 3/32* (2016.01)

(52) U.S. Cl.
CPC ....... *G09G 3/32* (2013.01); *G09G 2310/0267* (2013.01); *G09G 2310/0275* (2013.01)

(58) Field of Classification Search
CPC ............. G09G 3/32; G09G 2310/0267; G09G 2310/0275; G09G 3/3233; G09G 2300/043; G09G 2300/0852; G09G 2320/0233
See application file for complete search history.

(56) References Cited

U.S. PATENT DOCUMENTS

| | | | | |
|---|---|---|---|---|
| 2021/0320237 | A1* | 10/2021 | Kim | H10H 20/8316 |
| 2022/0198995 | A1* | 6/2022 | Ahmed | H10D 30/6755 |
| 2023/0177986 | A1* | 6/2023 | Lee | G09G 3/32 345/55 |
| 2023/0351946 | A1* | 11/2023 | Han | G09G 3/2088 |
| 2024/0355278 | A1* | 10/2024 | Lin | G09G 3/32 |

OTHER PUBLICATIONS

Abidur Rahaman et al., "A High-Gain CMOS Operational Amplifier Using Low-Temperature Poly-Si Oxide TFTs", IEEE Transactions on Electron Devices, vol. 67, No. 2, pp. 524-528, Jan. 6, 2020.

(Continued)

*Primary Examiner* — Andrew Sasinowski
(74) *Attorney, Agent, or Firm* — LEX IP MEISTER, PLLC

(57) ABSTRACT

A pixel circuit may include a first transistor that provides a data signal to a first node according to a scan signal, a second transistor that initializes the first node, a first capacitor that is coupled between one terminal to which a light emission signal is provided and the first node, a second capacitor that is coupled between the first node and a second node, a third transistor that includes a gate coupled to the second node and one terminal coupled to a third node, a fourth transistor that includes a gate coupled to the second node and one terminal coupled to the third node, a fifth transistor that is coupled between the second node and the third node, a drive transistor that includes a gate to which a voltage corresponding to the voltage at the third node is supplied, and a micro light emitting diode that is coupled to the drive transistor.

19 Claims, 12 Drawing Sheets

(56) References Cited

OTHER PUBLICATIONS

Yuanfeng Chen et al., "In-pixel temperature sensor for high-luminance active matrix micro-light-emitting diode display using low-temperature polycrystalline silicon and oxide thin-film-transistors", J. Soc. Inf. Display, vol. 28, No. 6, pp. 528-534, May 26, 2020.
Jongsu Oh et al., "Pixel Circuit With P-Type Low-Temperature Polycrystalline Silicon Thin-Film Transistor for Micro Light-Emitting Diode Displays Using Pulse Width Modulation", IEEE Electron Device Letters, vol. 42, No. 10, Oct. 2021.
Jongsu Oh et al., "Investigation on operation robustness of p-type low-temperature polycrystalline silicon thin-film transistor-based micro light-emitting diode pixel circuit using pulse width modulation under component fluctuation", Journal of Information Display 2022, vol. 23, No. 3, 185-192, Feb. 10, 2022.
Pei-An Zou et al., "A New Analog PWM Pixel Circuit With Metal Oxide TFTs for Micro-LED Displays", IEEE Transactions on Electron Devices, vol. 69, No. 8, Aug. 2022.
Kyeong-Soo Kang et al., "A Compact Amorphous In—Ga—Zn-Oxide Thin Film Transistor Pixel Circuit With Two Capacitors for Active Matrix Micro Light-Emitting Diode Displays", Journal of the Electron Devices Society, vol. 11, Mar. 24, 2023.
Eun Kyo Jung et al., "A New Pixel Circuit Based on LTPO Backplane Technology for Micro-LED Display Using PWM Method", SID Symp. Dig. Tech. Papers, vol. 52, No. 1, 2021, pp. 876-879.

* cited by examiner

PIXEL CIRCUIT AND DISPLAY INCLUDING THE SAME

CROSS-REFERENCE TO RELATED APPLICATION

This application claims priority to and the benefit of Korean Patent Application No. 10-2023-0076334 filed in the Korean Intellectual Property Office on Jun. 14, 2023, the entire contents of which are incorporated herein by reference.

BACKGROUND

(a) Technical Field

The present disclosure relates to a pixel circuit and a display including the same.

(b) Description of the Related Art

Displays including micro light emitting diodes have several advantages over liquid crystal displays (LCDs) and organic light emitting diodes (OLEDs), such as high brightness, high efficiency, low power consumption, and high durability. However, in micro light emitting diode displays, wavelength shifts may occur, or a problem that brightness is not maintained may occur. When a pulse amplitude modulation method of controlling the gray scale according to the related art is applied to micro light emitting diodes, wavelength shifts may be induced, resulting in significant image distortion. Uneven threshold voltages $V_{TH}$ between a plurality of thin film transistors (TFTs) which constitute a plurality of pixel circuits may cause brightness deviations between a plurality of pixels under the same gray scale condition.

SUMMARY

The present disclosure attempts to provide a pixel circuit for driving micro light emitting diodes and a display including the same.

A pixel circuit according to a feature of the invention may include a first transistor that provides a data signal to a first node according to a scan signal, a second transistor that initializes the first node, a first capacitor that is coupled between one terminal to which a light emission signal is provided and the first node, a second capacitor that is coupled between the first node and a second node, a third transistor that includes a gate coupled to the second node and one terminal coupled to a third node, a fourth transistor that includes a gate coupled to the second node and one terminal coupled to the third node, a fifth transistor that is coupled between the second node and the third node, a drive transistor that includes a gate to which a voltage corresponding to the voltage at the third node is supplied, and a micro light emitting diode that is coupled to the drive transistor. The third transistor may be a low-temperature polycrystalline silicon (LTPS) thin film transistor (TFT), and the fourth transistor may be an oxide TFT.

The pixel circuit may further include a sixth transistor that includes one terminal coupled to the third node and another terminal coupled to a fourth node, and a seventh transistor that includes one terminal coupled to the fourth node and another terminal to which drive voltage is supplied. To the gates of the sixth transistor and the seventh transistor, a light emission control signal for controlling light emission of the pixel circuit may be provided, and the inverted voltage of the voltage at the fourth node may be supplied to the gate of the drive transistor.

The seventh transistor may be a low-temperature polycrystalline silicon (LTPS) thin film transistor (TFT), and the sixth transistor may be an oxide TFT.

The pixel circuit may further include an eighth transistor that includes a gate coupled to the fourth node and one terminal coupled to a fifth node, and a ninth transistor that includes a gate coupled to the fourth node and one terminal coupled to the fifth node. The fifth node may be coupled to the gate of the drive transistor.

The eighth transistor may be a low-temperature polycrystalline silicon (LTPS) thin film transistor (TFT), and the ninth transistor may be an oxide TFT.

When the fifth transistor is turned on, a voltage corresponding to the threshold voltages of the third transistor and the fourth transistor may be stored in the second capacitor.

To the gate of the fifth transistor, a scan signal that transitions to an ON level prior to the scan signal may be provided.

The light emission signal may be at a first level when a data signal is written in the pixel circuit, and may transition from the first level to a second level after the data signal is written in the pixel circuit.

In a period when the light emission signal is at the first level, the fifth transistor may be turned on, whereby the voltage corresponding to the threshold voltages of the third transistor and the fourth transistor may be stored in the second capacitor.

A display according to another feature of the invention may include a display unit that includes a plurality of pixels, a scan driver that generates a plurality of scan signals and provides them to the plurality of pixels, a data driver that generates a plurality of data signals and provides them to the plurality of pixels, and a light emission driver that generates a light emission control signal for controlling light emission of the plurality of pixels and a light emission signal and provides them to the plurality of pixels. Each of the plurality of pixels may include a low-temperature poly-Si oxide (LTPO) transistor implemented with a low-temperature polycrystalline silicon (LTPS) thin film transistor (TFT) and an oxide TFT, and a corresponding data signal that is provided to each pixel according to a corresponding scan signal, the threshold voltage of the LTPO transistor, and a voltage that is determined according to the light emission signal may be provided to the gate of the LTPO transistor.

Each of the plurality of pixels may include a first transistor that provides a corresponding data signal to a first node according to a corresponding scan signal, a second transistor that initializes the first node, a first capacitor that is coupled between one terminal to which the light emission signal is provided and the first node, a second capacitor that is coupled between the first node and a second node, a third transistor that includes a gate coupled to the second node and one terminal coupled to a third node, a fourth transistor that includes a gate coupled to the second node and one terminal coupled to the third node, a fifth transistor that is coupled between the second node and the third node, a drive transistor that includes a gate to which a voltage corresponding to the voltage at the third node is supplied, and a micro light emitting diode that is coupled to the drive transistor. The third transistor may be a low-temperature polycrystalline silicon (LTPS) thin film transistor (TFT), and the fourth transistor may be an oxide TFT, and the LTPO transistor may include the third transistor and the fourth transistor.

The pixel circuit may further include a sixth transistor that includes one terminal coupled to the third node and another terminal coupled to a fourth node, and a seventh transistor that includes one terminal coupled to the fourth node and another terminal to which drive voltage is supplied. To the gates of the sixth transistor and the seventh transistor, the light emission control signal may be provided, and the inverted voltage of the voltage at the fourth node may be supplied to the gate of the drive transistor.

The seventh transistor may be a low-temperature polycrystalline silicon (LTPS) thin film transistor (TFT), and the sixth transistor may be an oxide TFT.

The pixel circuit may further include an eighth transistor that includes a gate coupled to the fourth node and one terminal coupled to a fifth node, and a ninth transistor that includes a gate coupled to the fourth node and one terminal coupled to the fifth node. The fifth node may be coupled to the gate of the drive transistor.

The eighth transistor may be a low-temperature polycrystalline silicon (LTPS) thin film transistor (TFT), and the ninth transistor may be an oxide TFT.

When the fifth transistor is turned on, a voltage corresponding to the threshold voltages of the third transistor and the fourth transistor may be stored in the second capacitor.

To the gate of the fifth transistor, a scan signal that transitions to an ON level prior to the corresponding scan signal may be provided.

The light emission signal may be at a first level when the plurality of data signals is written in the plurality of pixels, and may transition from the first level to a second level after the plurality of data signals is written in the plurality of pixels.

In a period when the light emission signal is at the first level, the fifth transistor may be turned on, whereby the voltage corresponding to the threshold voltages of the third transistor and the fourth transistor may be stored in the second capacitor.

The present invention provides a pixel circuit of a micro light emitting diode, and a display including the same.

DETAILED DESCRIPTION OF THE EMBODIMENTS

Hereinafter, exemplary embodiments disclosed in this specification will be described in detail with reference to the accompanying drawings; however, the same or similar constituent elements are denoted by the same or similar reference symbols, and a repeated description thereof will not be made.

Further, when describing exemplary embodiments disclosed in this specification, detailed descriptions of publicly known technologies will be omitted if it is determined that specific description thereof may obscure the gist of the exemplary embodiments disclosed in this specification. Furthermore, the accompanying drawings are provided for helping to easily understand exemplary embodiments disclosed in the present specification, and the technical spirit disclosed in the present specification is not limited by the accompanying drawings, and it will be appreciated that the present invention includes all of the modifications, equivalent matters, and substitutes included in the spirit and the technical scope of the present invention.

Terms including an ordinal number, such as first and second, are used for describing various constituent elements, but the constituent elements are not limited by the terms. The terms are used only to discriminate one constituent element from another constituent element.

When a constituent element is referred to as being "connected" or "coupled" to another constituent element, it will be appreciated that it may be directly connected or coupled to the other constituent element or intervening other constituent elements may be present. In contrast, when a constituent element is referred to as being "directly connected" or "directly coupled" to another constituent element, it will be appreciated that there are no intervening other constituent elements present.

In the present application, it will be appreciated that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance.

In the present disclosure, a display may display the gray scale in a pulse width modulation (PWM) scheme. In other words, pixels may emit light for the periods of pulse widths corresponding to gray scale information by constant drive current. Then, in the display of the present disclosure, wavelength shifts which are caused by a PAM scheme may not occur. In the present disclosure, the display may include compensation circuits for compensating the threshold voltages of transistors in individual pixels. The pixel circuit according to the present disclosure may include low-temperature poly-Si oxide (LTPO) complementary TFTs.

Figure 1:
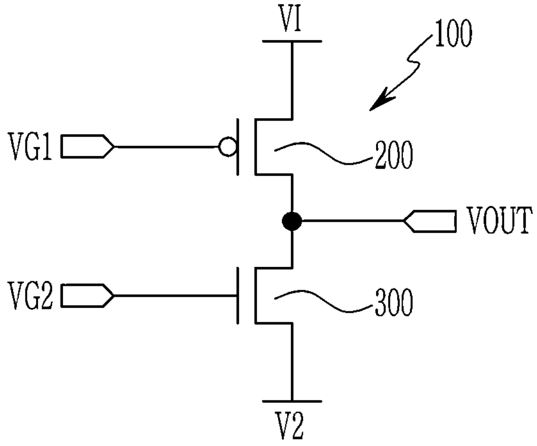
FIG. 1 is a circuit diagram of a complementary transistor according to an exemplary embodiment.

FIG. 1 is a circuit diagram of an LTPO complementary transistor according to an exemplary embodiment.

Figure 2:
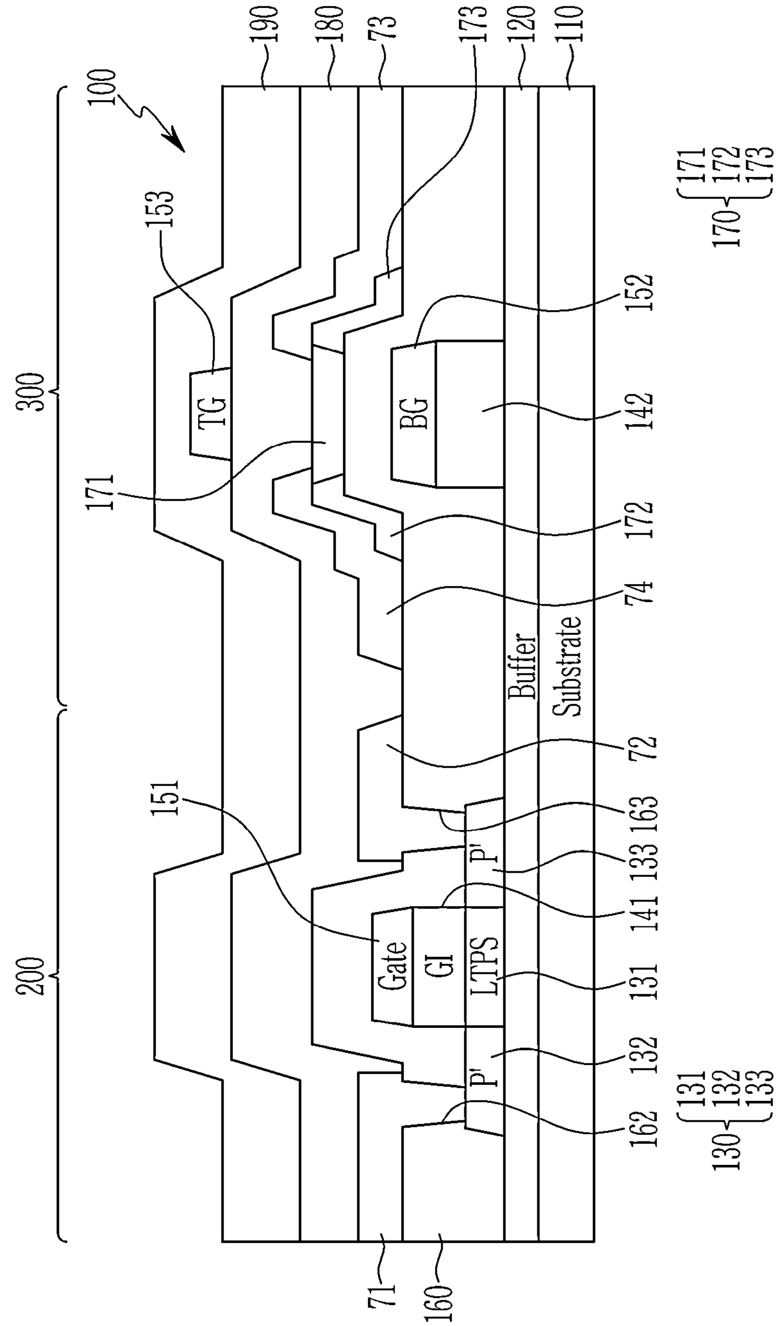
FIG. 2 is a cross-sectional view illustrating the structure of the complementary transistor according to the exemplary embodiment.

FIG. 2 is a cross-sectional view illustrating the structure of the complementary transistor according to the exemplary embodiment.

A complementary transistor 100 according to an exemplary embodiment includes a first transistor 200 and a second transistor 300.

To the source of the first transistor 200, a voltage V1 is supplied, and to the source of the second transistor 300, a voltage V2 is supplied, and the drain of the first transistor 200 and the drain of the second transistor 300 are coupled to each other. The contact point at which the two drains are coupled may be the output terminal of the transistor 100. To the gate of the first transistor 200, a gate voltage VG1 is supplied to control the conduction of the first transistor 200, and to the gate of the second transistor 300, a gate voltage VG2 is supplied to control the conduction of the second transistor 300.

When the gates of the first transistor 200 and the second transistor 300 are coupled to each other, the transistor 100 may serve as an inverter. In other words, one of the first transistor 200 and the second transistor 300 is turned on and the other is turned off by the gate voltages (VG1 or VG2), whereby one of the voltage V1 and the voltage V2 is output as an output voltage Vout.

The first transistor 200 according to the exemplary embodiment is implemented in the form of a low-temperature polycrystalline silicon and oxide thin-film transistor (LTPO TFT). The first transistor 200 may be a p-type low-temperature polycrystalline silicon (LTPS) TFT. The second transistor 300 may be implemented in the form of an oxide TFT. For example, the second transistor 300 may be implemented in the form of an amorphous-indium-gallium-zinc-oxide (IGZO) TFT, which is an example of oxide TFTs. However, the examples of the first and second transistors are for describing the exemplary embodiment, and the present invention is not limited thereto.

The second transistor 300 may be a dual-gate (DG) n-type TFT. The second transistor 300 may be formed in a back channel etch (BCE) type. The top gate (TG) and bottom gate (BG) of the second transistor 300 may be electrically coupled, such that the on-state current of the second transistor 300 is high and the threshold voltage is uniform at 0 V. Specific manufacturing processes of the first and second transistors 200 and 300 can be found in the following two publicly known papers. Accordingly, a detailed description of the manufacturing processes will not be made. The second transistor 300 has been described as having a dual-gate structure as an example to describe the exemplary embodiment, but the second transistor 300 of the present invention may be implemented in the form of an oxide TFT having a single-gate structure.

1) A. Rahaman, H. Jeong and J. Jang, “A High-Gain CMOS Operational Amplifier Using Low-Temperature Poly-Si Oxide TFTs,” IEEE Transactions on Electron Devices, vol. 67, no. 2, pp. 524-528, February 2020.
2) Y. Chen, S. Lee, H. Kim, J. Lee, D. Geng, and J. Jang, “In-pixel temperature sensor for high-luminance active matrix micro-light-emitting diode display using low-temperature polycrystalline silicon and oxide thin-film-transistors,” J. Soc. Inf. Display, vol. 28, no. 6, pp. 528-534, May 2020.

Referring to FIG. 2, a buffer layer 120 is positioned on a substrate 110. The buffer layer 120 may have a single-layer or multi-layer structure. In FIG. 1, the buffer layer 120 is shown as a single layer; however, in some exemplary embodiments, the buffer layer may consist of multiple layers. The buffer layer 120 may contain an organic insulating material or an inorganic insulating material. As an example, the buffer layer 120 may contain at least one of silicon nitride ($SiN_x$), silicon oxide ($SiO_x$), and silicon oxynitride ($SiO_xN_y$).

On the buffer layer 120, a first semiconductor layer 130 which includes a first region 131, a second region 132, and a third region 133 are positioned.

The semiconductor layer 130 may contain poly-silicon, for example, low temperature poly silicon.

The first region 131 of the semiconductor layer 130 may be a channel region, and the second region 132 and third region 133 of the semiconductor layer 130 may be a source region and a drain region.

The sheet resistance of the first region 131 which is the channel region of the first semiconductor layer 130 is larger than the sheet resistance of the second region 132 and the third region 133 which are the source region and drain region of the first semiconductor layer 130, and the carrier concentration of the first region 131 which is the channel region of the first semiconductor layer 130 is lower than the carrier concentrations of the second region 132 and the third region 133 which are the source region and drain region of the first semiconductor layer 130.

The first region 131 which is the channel region of the first semiconductor layer 130 may not contain impurities. The concentrations of impurities in the second region 132 and third region 133 of the first semiconductor layer 130 may be higher than the concentration of impurities in the first region 131 of the first semiconductor layer 130. The second region 132 and the third region 133 of the first semiconductor layer 130 may contain impurities, for example, N-type impurities or P-type impurities. For example, the N-type impurities may be phosphorus (P), arsenic (As), or antimony (Sb), and the P-type impurities may be boron (B), aluminum (Al), or indium (In).

On the first region 131 of the first semiconductor layer 130, a gate insulating film (GI) 141 is positioned. The gate insulating film 141 may contain an organic insulating material or an inorganic insulating material, and as an example, the gate insulating film 141 may contain at least one of silicon nitride, silicon oxide, silicon oxynitride, and tetra ethyl ortho silicate (TEOS).

On the gate insulating film 141, a first gate electrode 151 is positioned. The first gate electrode 151 is disposed so as to overlap the first region 131 of the first semiconductor layer 130, and the gate insulating film 141 is positioned between the first region 131 of the first semiconductor layer 130 and the gate electrode 151. The first gate electrode 151 may be a multi-layer film including a metal film containing at least one of copper (Cu), a copper alloy, aluminum (Al), an aluminum alloy, molybdenum (Mo), and a molybdenum alloy.

An insulating pattern 142 may be positioned on the buffer layer 120. On the insulating pattern 142, a bottom gate (BG) electrode 152 may be positioned. The insulating pattern 142 and the gate insulating film 141 may be formed in the same process step, the bottom gate electrode 152 and the first gate electrode 151 may be formed in the same process step.

On the first semiconductor layer 130, the first gate electrode 151, and the bottom gate electrode 152, a passivation layer 160 is positioned. The passivation layer 160 may contain at least one of silicon nitride, silicon oxide, silicon oxynitride, and tetra ethyl ortho silicate (TEOS), and may be formed of an organic material such as a polyacrylates resin or a polyimides resin, or a laminated film of an organic material and an inorganic material. The passivation layer 160 has a first contact hole 162 which overlaps the second region 132 of the first semiconductor layer 130, and a second contact hole 163 which overlaps the third region 133 of the first semiconductor layer 130.

On the passivation layer 160, a second semiconductor layer 170 which overlaps the bottom gate electrode 152 and includes a first region 171, a second region 172, and a third region 173 is positioned. The second semiconductor layer 170 may contain an oxide semiconductor.

The oxide semiconductor may contain at least one of oxides of single-component metals such as oxides of indium (In), oxides of tin (Sn), or oxides of zinc (Zn), oxides of two-component metals such as In—Zn-based oxides, Sn—Zn-based oxides, Al—Zn-based oxides, Zn—Mg-based oxides, Sn—Mg-based oxides, In—Mg-based oxides, or In—Ga-based oxides, oxides of three-component metals such as In—Ga—Zn-based oxides, In—Al—Zn-based oxides, In—Sn—Zn-based oxides, Sn—Ga—Zn-based oxides, Al—Ga—Zn-based oxides, Sn—Al—Zn-based oxides, In—Hf—Zn-based oxides, In—La—Zn-based oxides, In—Ce—Zn-based oxides, In—Pr—Zn-based oxides, In—Nd—Zn-based oxides, In—Sm—Zn-based oxides, In—Eu—Zn-based oxides, In—Gd—Zn-based oxides, In—Tb—Zn-based oxides, In—Dy—Zn-based oxides, In—Ho—Zn-based oxides, In—Er—Zn-based oxides, In—Tm—Zn-based oxides, In—Yb—Zn-based oxides, or In—Lu—Zn-based oxides, and oxides of four-component metals such as In—Sn—Ga—Zn-based oxides, In—Hf—Ga—Zn-based oxides, In—Al—Ga—Zn-based oxides, In—Sn—Al—Zn-based oxides, In—Sn—Hf—Zn-based oxides, or In—Hf—Al—Zn-based oxides. For example, the second semiconductor layer 170 may contain an indium-gallium-zinc oxide (IGZO) of the In—Ga—Zn-based oxides.

The second semiconductor layer 170 may contain at least one of indium-gallium-zinc oxide (IGZO), indium-zinc-tin oxide (IZTO), indium-gallium-zinc-tin oxide (IGZTO), and indium-gallium oxide (IGO).

The first region 171 of the second semiconductor layer 170 is a channel region, and the second region 172 and third region 173 of the second semiconductor layer 170 may be a source region and a drain region.

On the passivation layer 160, a first source electrode 71 and a first drain electrode 72 are positioned, and on the passivation layer 160 and the second semiconductor layer 170, a second source electrode 73 and a second drain electrode 74 are positioned.

The first source electrode 71 and the first drain electrode 72 are coupled to the second region 132 which is the source region of the first semiconductor layer 130 and the third region 133 which is the drain region of the first semiconductor layer 130 through the first contact hole 162 and the second contact hole 163 in the passivation layer 160. The second source electrode 73 and the second drain electrode 74 may be positioned on the second region 172 which is the source region of the second semiconductor layer 170 and the third region 173 which is the drain region of the second semiconductor layer 170. The first source electrode 71, the first drain electrode 72, the second source electrode 73, and the second drain electrode 74 may contain an aluminum-based metal, a silver-based metal, and a copper-based metal having low specific resistance, and may be, for example, a triple-layer structure of a lower film containing a refractory metal such as titanium, molybdenum, chromium, and tantalum, or an alloy thereof, an intermediate film containing an aluminum-based metal, a silver-based metal, or a copper-based metal having low specific resistance, and an upper film containing a refractory metal such as titanium, molybdenum, chromium, and tantalum, or an alloy thereof.

On the first source electrode 71, the first drain electrode 72, the second source electrode 73, and the second drain electrode 74, a second gate insulating film 180 may be positioned, and on the second gate insulating film 180, a top gate (TG) electrode 153 may be positioned.

The top gate electrode 153 and the bottom gate electrode 152 may overlap the first region 171 which is the channel region of the second semiconductor layer 170.

On the top gate electrode 153, a second passivation layer 190 may be positioned.

The first semiconductor layer 130 may form the first transistor 200 together with the first gate electrode 151, the first source electrode 71, and the first drain electrode 72. The channel region of the first transistor 200 may be formed in the first region 131 between the second region 132 and third region 133 of the first semiconductor layer 130.

Similarly, the second semiconductor layer 170 may form the second transistor 300 together with the bottom gate electrode 152, the top gate electrode 153, the second source electrode 73, and the second drain electrode 74. The channel region of the second transistor 300 is formed in the first region 171 between the second region 172 and third region 173 of the second semiconductor layer 170.

Although not shown in FIG. 2, in at least one of the second gate insulating film 180 and the second passivation layer 190, a contact hole for coupling the first source electrode 71 and the second source electrode 73 to a line (not shown in the drawings) for supplying a predetermined voltage may be positioned. Also, in at least one of the second gate insulating film 180 and the second passivation layer 190, a contact hole for coupling the first drain electrode 72 and the second drain electrode 74 to each other may be positioned.

Figure 3A:
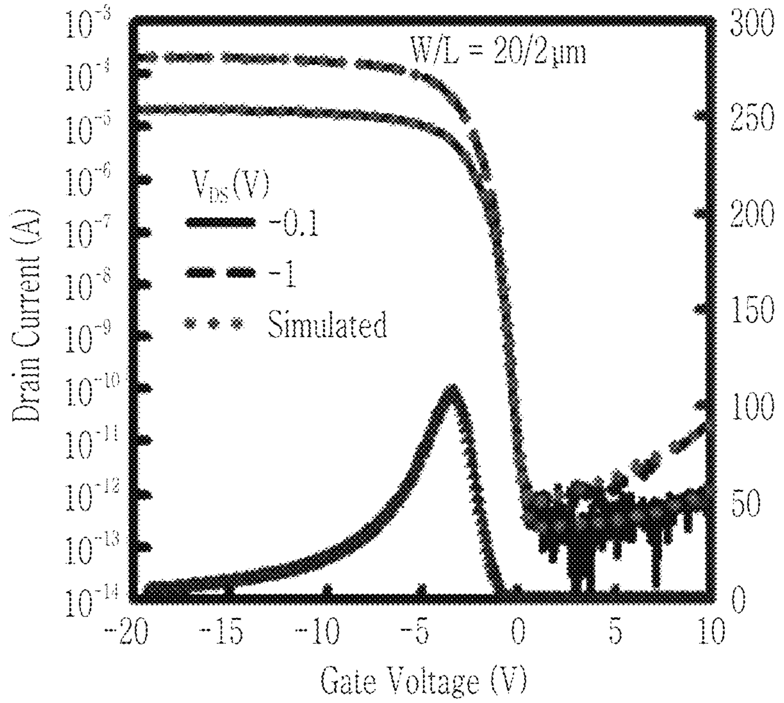
FIG. 3A is a curve depicting the transfer characteristic of a first transistor according to the exemplary embodiment.

FIG. 3A is a curve depicting the transfer characteristic of the first transistor according to the exemplary embodiment.

Figure 3B:
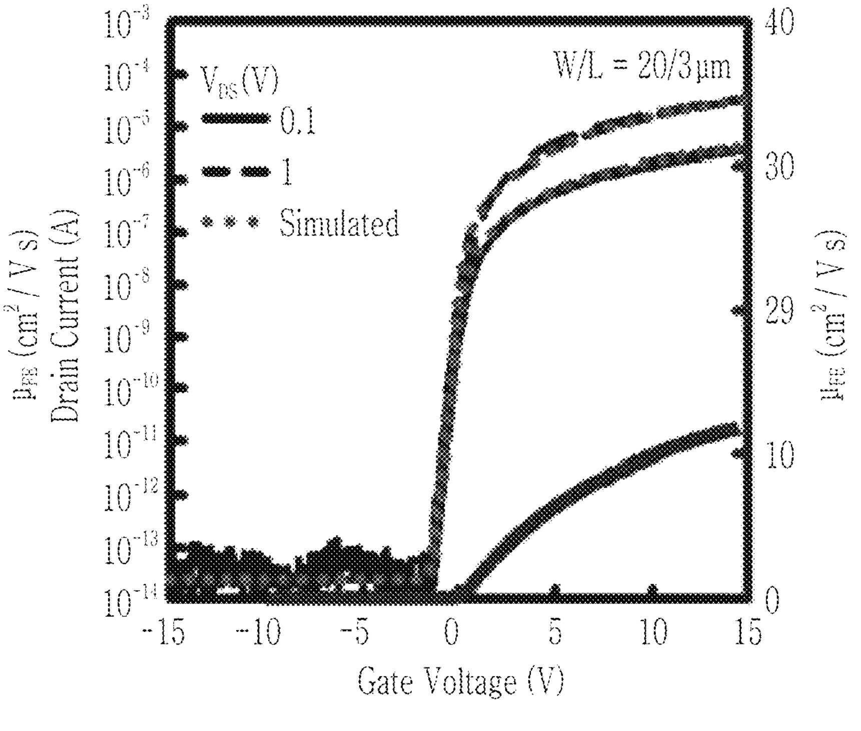
FIG. 3B is a curve depicting the output characteristic of a second transistor according to the exemplary embodiment.

FIG. 3B is a curve depicting the output characteristic of the second transistor according to the exemplary embodiment.

In the cross-sectional structure shown in FIG. 2, the channel widths of the first transistor 200 and the second transistor 300 are 20 μm, and the channel lengths are 2 μm and 3 μm, respectively. In this case, the field effect mobility $\mu_{FE}$, subthreshold swing SS, and threshold voltage $V_{TH}$ of the first transistor 200 may be 107.2 $cm^2/Vs$, 0.32 V/dec, and −0.32 V. The field effect mobility $\mu_{FE}$, subthreshold swing SS, and threshold voltage $V_{TH}$ of the second transistor 300 may be 11.7 $cm^2/Vs$, 0.31 V/dec, and −0.1 V.

Figure 4:
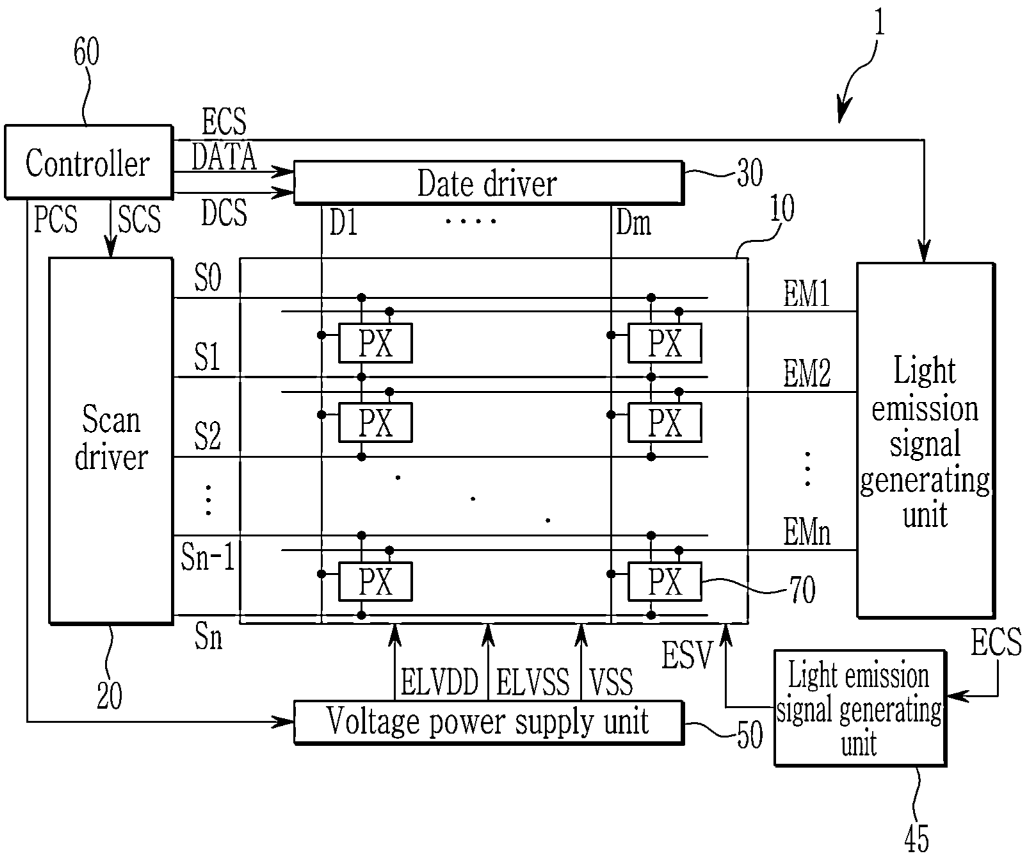
FIG. 4 is a view illustrating a display according to an exemplary embodiment.

FIG. 4 is a view illustrating a display according to an exemplary embodiment.

As shown in FIG. 4, a display 1 includes a display unit 10 including a plurality of pixels PX, a scan driver 20, a data driver 30, a light emission control signal generating unit 40, a light emission signal generating unit 45, a power supply unit 50, and a controller 60. In FIG. 4, the light emission control signal generating unit 40 and the light emission signal generating unit 45 are shown as separate components; however, the invention is not limited thereto. The light emission control signal generating unit 40 and the light emission signal generating unit 45 are an example of a light emission driver which controls and drives light emission of the plurality of pixels PX, and may be integrated into one component.

Each of the plurality of pixels PX is coupled to each of the two corresponding scan lines of a plurality of scan lines SO to Sn, one corresponding light emission control line of a plurality of light emission control lines EM1 to EMn, and one corresponding data line of a plurality of data lines D1 to Dm. Further, although not directly shown in the display unit 10 of FIG. 4, each of the plurality of pixels PX is coupled to a plurality of power supply lines, thereby capable of receiving a first power voltage ELVDD, a second power voltage ELVSS, and a drive voltage VSS.

The display unit 10 includes the plurality of pixels PX arranged substantially in a matrix form. Although not particularly limited, the plurality of scan lines SO to Sn and the plurality of light emission control lines EM1 to EMn extend toward opposite directions along the almost row direction in the arrangement form of the pixels and are substantially parallel with one another, and the plurality of data lines D1 to Dm extend along the almost column direction and are substantially parallel with one another.

Figure 5:
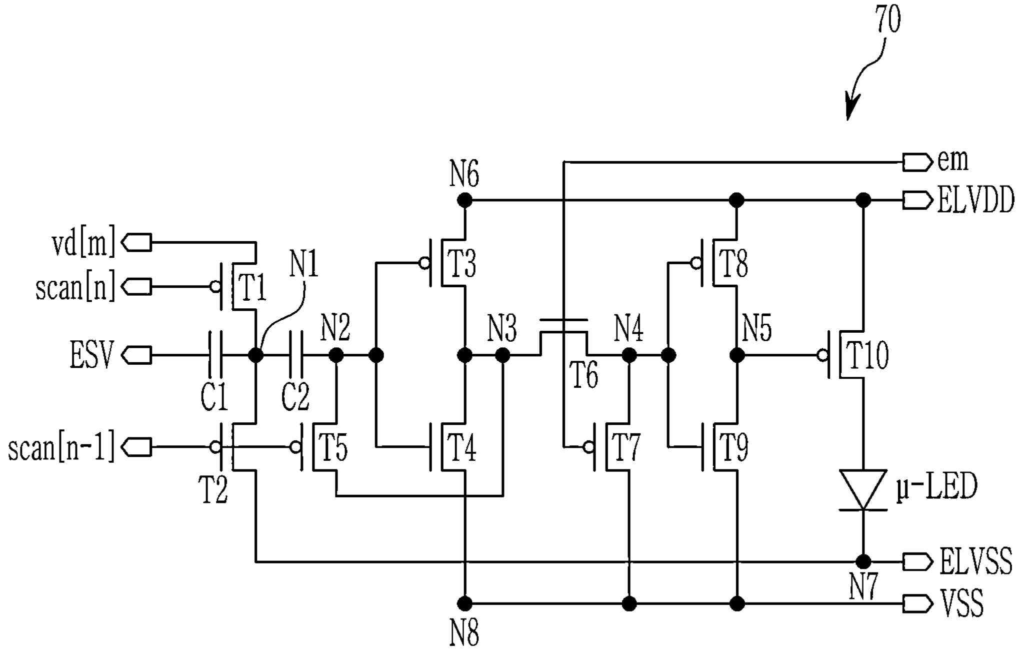
FIG. 5 is a circuit diagram illustrating a pixel circuit which constitutes a pixel according to an exemplary embodiment.

Each of the plurality of pixels PX in the display unit 10 is coupled to two corresponding scan lines. One pixel row consisting of a plurality of pixels PX may be coupled to one corresponding scan line and another adjacent scan line. For example, as shown in FIG. 5, a plurality of pixels PX that is positioned in the second pixel row may be coupled to one scan line (for example, S2) corresponding to the second pixel row and another scan line (for example, S1) corresponding to the first pixel row adjacent to the second pixel row.

The plurality of pixels PX may compensate the threshold voltages of complementary CMOS transistors by being synchronized with a scan signal which was at an ON level in the previous horizontal period. Each of the plurality of pixels PX may supply drive current to micro light emitting diodes for a period according to a data signal which is transferred through the plurality of data lines D1 to Dm.

The scan driver 20 may generate a scan signal corresponding to each pixel, and transmit the scan signals through the plurality of scan lines SO to Sn. The scan driver 20 may receive a scan drive control signal SCS from the controller 60, generate a plurality of scan signals, and sequentially supply the scan signals to the plurality of scan lines SO to Sn coupled to the individual pixel rows. Each of the plurality of pixels PX may receive two scan signals through two corresponding scan lines.

The data driver 30 may generate a plurality of data signals for each horizontal period and provide them to the plurality of data lines D1 to Dm. Then, the plurality of data signals may be provided to the plurality of pixels PX on a pixel row basis. The data driver 30 may receive a data drive control signal DCS from the controller 60, and generate a plurality of data signals by classifying image data signals DATA for each horizontal period. The data driver 30 may provide a plurality of data signals in units of a pixel row to the plurality of data lines D1 to Dm at a data enable time point according to the data drive control signal DCS.

The light emission control signal generating unit 40 is coupled to the plurality of light emission control lines EM1 to EMn. The plurality of light emission control lines EM1 to EMn extends in parallel with one another along the row direction of the plurality of pixels PX. Each of the plurality of light emission control lines EM1 to EMn is coupled to the plurality of pixels PX in a corresponding pixel row. The light emission control signal generating unit 40 may generate a light emission control signal em in response to a light emission drive control signal ECS for each vertical period, and supply the light emission control signal em to the plurality of light emission control lines EM1 to EMn. Each of the plurality of pixels PX may emit light for a period according to a corresponding data signal in an on-level period of the light emission control signal em.

The light emission signal generating unit 45 may provide the light emission signal ESV to the plurality of pixels PX in response to the light emission drive control signal ECS. The light emission signal ESV and the light emission control signal em may be signals synchronized with each other, and the light emission signal ESV may be a signal that decreases at a constant slope for a light emission period in the period of one frame. Each of the plurality of pixels PX may emit light for a period when voltage that is determined according to the light emission signal ESV and the corresponding data signal is equal to or higher than a reference voltage. In the following description, the light emission period in the period of one frame may be referred to as a pulse width period.

The power supply unit 50 may generate the first power voltage ELVDD, the second power voltage ELVSS, and the drive voltage VSS and supply them to the plurality of pixels PX in the display unit 10. The first power voltage ELVDD may be a predetermined high-level voltage, and the second power voltage ELVSS may be a voltage lower than the first power voltage ELVDD. The voltage values of the first power voltage ELVDD and the second power voltage ELVSS are not particularly limited, but the voltage values may be set or controlled under the control of a power control signal PCS transmitted from the controller 60. The drive voltage VSS may be a control voltage required to drive the pixels PX.

The controller 60 may generate an image data signal DATA for controlling light emission of the plurality of pixels PX, in units of a frame, according to a plurality of image signals that is transmitted from the outside. The controller 60 may provide the image data signal DATA in units of a frame, to the data driver 30. The controller 60 receives a vertical synchronization signal Vsync, a horizontal synchronization signal Hsync, and a clock signal MCLK (not shown in the drawings), generates control signals for controlling driving of the scan driver 20, the light emission control signal generating unit 40, and the data driver 30, and transmits the control signals to them, respectively. In other words, the controller 60 generates a scan drive control signal SCS for controlling the scan driver 20, a light emission drive control signal ECS for controlling the light emission control signal generating unit 40 and the light emission signal generating unit 45, and a data drive control signal DCS for controlling the data driver 30, and transmits the generated control signals to them, respectively.

Further, the controller 60 may generate a power control signal PCS for controlling driving of the power supply unit 50, and transmit it to the power supply unit 50. The power control signal PCS may contain information indicating the levels of the first power voltage ELVDD, the second power voltage ELVSS, and the drive voltage VSS.

FIG. 5 is a circuit diagram illustrating a pixel circuit which constitutes a pixel according to an exemplary embodiment.

FIG. 5 shows a pixel circuit 70 of one of the plurality of pixels PX. The pixel circuit 70 is coupled to two scan lines Sn−1 and Sn, the light emission control line EMn, and the data line Dm. The plurality of pixels PX may be implemented with the same circuits as the pixel circuit 70. The pixel circuit 70 may include ten transistors T1 to T10 and two capacitor C1 and C2. Two transistors T3 and T4, two transistors T7 and T6, and two transistors T8 and T9 may be implemented with LTPO complementary transistors as shown in FIG. 1. Four transistors T1, T2, T5, and T10 may be implemented with LTPS transistors. Accordingly, among the ten transistors constituting the pixel circuit 70, seven transistors T1, T2, T3, T5, T7, T8, and T10 may be LTPS transistors and be a p-channel type, and three transistors T4, T6, and T9 may be an oxide semiconductor and be an n-channel type.

To a node N6, the first power voltage ELVDD may be supplied, and to a node N7, the second power voltage ELVSS may be supplied, and to a node N8, the drive voltage VSS may be supplied. To one electrode of the capacitor C1, the light emission signal ESV may be supplied, and the other electrode of the capacitor C1 may be coupled to a node N1. One electrode of the capacitor C2 may be coupled to the node N1, and the other electrode of the capacitor C2 may be coupled to a node N2.

The source of the transistor T1 is coupled to the data line Dm, and the gate of the transistor T1 is coupled to the scan line Sn, and the drain of the transistor T1 is coupled to the node N1. To the source and gate of the transistor T1, a data signal vd[m] and a scan signal scan[n] may be supplied. When the transistor T1 is turned on by the ON level (for example, low level) of the scan signal scan[n], the data signal vd[m] may be supplied to the node N1.

The source of the transistor T2 is coupled to the node N1, and the gate of the transistor T2 is coupled to the scan line Sn−1, and the drain of the transistor T2 is coupled to the node N7. To the gate of the transistor T2, a scan signal scan[n−1] may be supplied. When the transistor T2 is turned on by the ON level (for example, low level) of the scan signal scan[n−1], the second power voltage ELVSS may be supplied to the node N1. The transistor T2 is a transistor for initializing the voltage at the node N1, and it is shown in FIG. 5 that the transistor T2 is turned on by the previous scan signal scan[n−1], thereby supplying the second power voltage ELVSS to the node N1. However, the invention is not limited thereto, and instead of the previous scan signal, a separate initialization control signal may be supplied to the gate of the transistor T2, or instead of the second power voltage ELVSS, a separate voltage may be supplied as an initialization voltage.

The transistor T3 and the transistor T4 that constitute an LTPO complementary transistor are coupled in series between the node N6 and the node N8. The source of the transistor T3 is coupled to the node N6, and the source of the transistor T4 is coupled to the node N8. The gate of the transistor T3 and the gate of the transistor T4 are coupled to the node N2. The drain of the transistor T3 and the drain of the transistor T4 are coupled to each other at a node N3. When the transistor T3 is turned on, the first power voltage ELVDD can be supplied to the node N3, and when the transistor T4 is turned on, the drive voltage VSS can be supplied to the node N3.

The source of the transistor T5 may be coupled to the node N2, and the drain of the transistor T5 may be coupled to the node N3, and the gate of the transistor T5 may be coupled to the scan line Sn−1. When the transistor T5 is turned on by the ON level (for example, low level) of the scan signal scan[n−1], diode connections in which the gate and drain of each of the transistor T3 and the transistor T4 are coupled may be formed. Then, a voltage reflecting the threshold voltage of each of the transistor T3 and the transistor T4 may be supplied the node N2, and in the capacitor C2, a voltage corresponding to the threshold voltage of each of the transistor T3 and the transistor T4 may be stored. The transistor T5 is a transistor for compensating the threshold voltages of the transistors T3 and T4, and it is shown in FIG. 5 that the transistor T5 is turned on by the previous scan signal scan[n−1]. However, the invention is not limited thereto, and instead of the previous scan signal, a separate threshold voltage compensation control signal may be supplied to the gate of the transistor T5.

The transistor T7 and the transistor T6 that constitute an LTPO complementary transistor are coupled in series between the node N8 and the node N3. The source of the transistor T7 is coupled to the node N8, and the source of the transistor T6 is coupled to the node N3. The gate of the transistor T7 and the gate of the transistor T6 are coupled to the light emission control line EMn. The drain of the transistor T7 and the drain of the transistor T6 are coupled to each other at a node N4. When the transistor T6 is turned on and the transistor T7 is turned off by a high-level light emission control signal em, the node N3 and the node N4 can be coupled. When the transistor T7 is turned on and the transistor T6 is turned off by a low-level light emission control signal em, the node N3 and the node N4 are electrically decoupled, whereby the second power voltage ELVSS can be supplied to the node N4. FIG. 5 shows that the drain of the transistor T7 is coupled to the node N8; however, the invention is not limited thereto. The drain of the transistor T7 is coupled to the node N7. When the drain of the transistor T7 is coupled to the node N7, the node N4 can be reset by the power voltage ELVSS, and thus it is more stable as compared to when the node N4 is reset by the voltage VSS. When the drain of the transistor T7 is coupled to the node N8 as shown in FIG. 5, the transistor T9 can be more stably switched in a depletion mode according to the voltage VSS than according to the power voltage ELVSS. In the exemplary embodiment, in order to more stably reset the node N4, the drain of the transistor T7 is coupled to the node N7 as shown in FIG. 5.

The transistor T8 and the transistor T9 that constitute an LTPO complementary transistor are coupled in series between the node N6 and the node N8. The source of the transistor T8 is coupled to the node N6, and the source of the transistor T9 is coupled to the node N8. The gate of the transistor T8 and the gate of the transistor T9 are coupled to the node N4. The drain of the transistor T8 and the drain of the transistor T9 are coupled to each other at a node N5. When the transistor T8 is turned on, the first power voltage ELVDD can be supplied to the node N5, and when the transistor T9 is turned on, the drive voltage VSS can be supplied to the node N5.

The source of the transistor T10 may be coupled to the node N6, and the gate of the transistor T10 may be coupled to the node N5, and the drain of the transistor T10 may be coupled to anode of a micro light emitting diode (μ-LED). The cathode of the micro light emitting diode (μ-LED) is coupled to the node N7. The transistor T10 is a drive transistor for supplying current to the micro light emitting diode (μ-LED), and while the transistor T10 is on, constant drive current which is determined by the voltage between the gate and source of the transistor T10 can be supplied to the micro light emitting diode (μ-LED). For example, when the drive voltage VSS is supplied to the node N5, the transistor T10 may be turned on. Then, the drive current based on the voltage difference between the first power voltage ELVDD and the drive voltage VSS flows in the micro light emitting diode (μ-LED), and the micro light emitting diode (μ-LED) can emit light with brightness based on the drive current.

In the present disclosure, the first power voltage ELVDD, the second power voltage ELVSS, and the drive voltage VSS may be 5 V, 0 V, and −10 V, respectively. To turn on the transistor T10, the drive voltage VSS may be lower than the second power voltage ELVSS. The high level and low level of each of the light emission control signal em and scan signals scan[0] to scan[n] may be 5 V and −10 V, respectively. When the voltage range of data signals is from 0 V to 3.2 V, the swing range of the light emission signal ESV may be from 0 V to 3 V.

Figure 6:
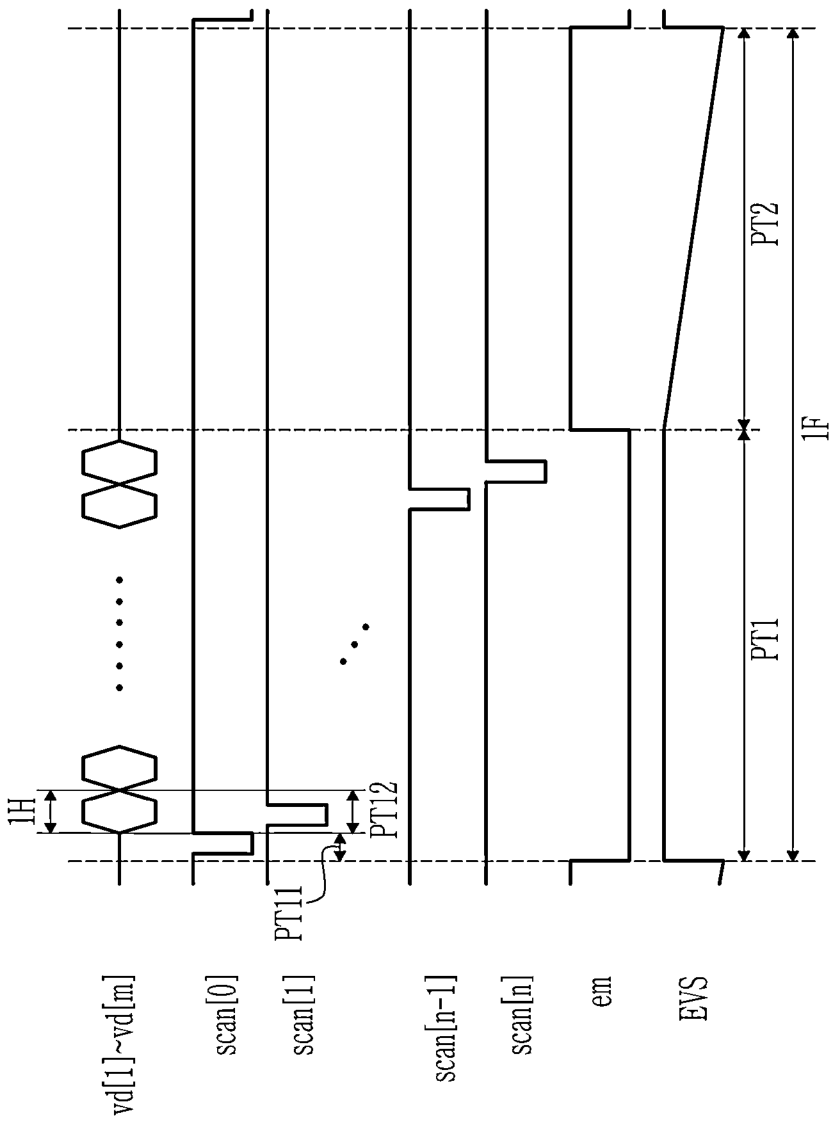
FIG. 6 is a waveform diagram illustrating the waveforms of a data signal, a scan signal, a light emission control signal, and a light emission signal according to the exemplary embodiment.

FIG. 6 is a waveform diagram illustrating the waveforms of a data signal, a scan signal, a light emission control signal, and a light emission signal according to the exemplary embodiment.

In a description of the components of the pixel circuit 70 necessary to describe the operation of a pixel PX with reference to FIG. 6, the reference symbols in FIG. 5 will be referred to. FIG. 6 shows the waveforms of a plurality of data signals vd[1] to vd[m], a plurality of scan signals scan[0] to scan[n], a light emission control signal em, and a light emission signal ESV for one frame period 1F corresponding to one frame. One frame period 1F includes a threshold voltage compensation and scan period PT1 that is a period when the threshold voltages of a plurality of pixels PX are compensated and the plurality of data signals vd[1] to vd[m] is programmed in the plurality of pixels PX, and a light emission period PT2 when the plurality of pixels PX emits light for a period based on the data signals programmed in the plurality of pixels PX. During the period PT1, the light emission control signal em is at the low level, and the transistor T7 is on, and the voltage at the node N4 is the voltage VSS which is the low level. Then, in a state where the transistor T8 is on, the power voltage ELVDD which is the high level is supplied to the gate of the transistor T10, causing the transistor T10 to be off. In other words, during the period PT1, all pixels PX in the display unit 10 do not emit light.

The plurality of data signals vd[1] to vd[m] may have a voltage level for controlling the light emission period of the plurality of pixels PX in a corresponding pixel row during each horizontal period 1H. In FIG. 6, the plurality of data signals vd[1] to vd[m] for each horizontal period is shown in the form of a hexagonal waveform.

The plurality of scan signals scan[0] to scan[n] is sequentially generated in the form of a pulse at the low level which is the ON level during a corresponding horizontal period 1H. The scan signal scan[0] is a signal for controlling compensation on the threshold voltages of the plurality of pixels PX in the first pixel row, and does not function as a signal for data writing, unlike the other scan signals scan[1] to scan[n] for programming the plurality of data signals vd[1] to vd[m] in the plurality of pixels PX. In the exemplary embodiment, each of the plurality of scan signals scan[1] to scan[n] will be described as a signal for controlling threshold voltage compensation on another pixel row adjacent to a corresponding pixel row. However, the invention is not limited thereto, and separate signals may be added.

During the threshold voltage compensation and scan period PT1, the light emission control signal em may be at the low level, and the light emission signal ESV may be maintained at the high level. During the light emission period PT2, the light emission control signal em may be at the high level, and the light emission signal ESV may decrease at a predetermined slope. The predetermined slope may be changed depending on the design. Since the light emission signal ESV swings in the range from 0 V to 3 V, the predetermined slope may be set such that the light emission signal ESV can decrease from 3 V to 0 V for the light emission period PT2.

First, in a period PT11, when the scan signal scan[0] is at the ON level, the transistor T2 is turned on, causing the voltage at the node N1 to be the drive voltage VSS, and the transistor T5 is turned on, causing the transistor T3 and the transistor T4 to form a diode connection. Then, an intermediate voltage VM of the first power voltage ELVDD based on the threshold voltages VTH3 and VTH4 of the transistor T3 and the transistor T4 can be supplied to the node N2. In the capacitor C2, a voltage corresponding to the difference between the drive voltage VSS and the intermediate voltage VM can be stored.

The intermediate voltage may be defined as the following Expression 1.

$$VM = \frac{ELVDD - |VTH3| + VTH4\sqrt{\frac{\beta_{T4}}{\beta_{T3}}}}{1 + \sqrt{\frac{\beta_{T4}}{\beta_{T3}}}} \quad \text{[Expression 1]}$$

In Expression 1, β may be defined as Expression 2 according to the channel length L, channel width W, charge mobility μ, and oxide capacitance Cox of a transistor.

$$\beta = \frac{L\mu Cox}{W} \quad \text{[Expression 2]}$$

Next, in a period PT12, when the scan signal scan[1] is at the ON level, the transistor T1 is turned on, causing the data signal vd[m] to be supplied to the node N1. Then, the voltage at the node N1 changes from the power voltage ELVSS to the voltage Vdata of the data signal vd[m] (hereinafter, referred to as data voltage), and the change in the voltage at the node N1 is divided by the two capacitors C1 and C2. Accordingly, the voltage at the node N2 may be expressed as the following Expression 3.

$$VN2 = (C1 + C2)/C2 * (Vdata - ELVSS) + VM \quad \text{[Expression 3]}$$

In Expression 3, 'C1' and 'C2' refers to the capacitance of the capacitors C1 and C2, respectively, and 'VM' refers to the intermediate voltage VM in Expression 1.

During the period PT2 following the period PT1, the light emission control signal em at the high level is supplied to the plurality of pixels PX. Accordingly, among the plurality of pixels PX, the transistor T7 is turned off and the transistor T6 is turned on for the period PT2. Then, the voltage at the node N2 is inverted by two transistors T3 and T4, and provided to the node N4. When the voltage at the node N2 is equal to or higher than a reference voltage, the transistor T4 may be turned on, causing the voltage at the node N4 to be the drive voltage VSS, and when the voltage at the node N2 is lower than the reference voltage, the transistor T3 may be turned on, causing the voltage at the node N4 to be the power voltage ELVDD. When the voltage at the node N4 is the drive voltage VSS, the transistor T8 is turned on, causing the transistor T10 to be turned off by the power voltage ELVDD, and when the voltage at the node N4 is the power voltage ELVDD, the transistor T9 is turned on, causing the transistor T10 to be turned on by the drive voltage VSS. While the transistor T10 is on, the micro light emitting diode (μ-LED) can emit light according to the drive current flowing from the power voltage ELVDD to the power voltage ELVSS.

Since the light emission signal ESV decreases for the period PT2, the voltage at the node N2 coupled to the light emission signal ESV through the capacitor C1 and the capacitor C2 may also decrease. Even if the voltage at the node N2 is equal to or higher than the reference voltage at the beginning of the period PT2, the micro light emitting diode (μ-LED) can emit light from when the voltage at the node N2 becomes lower than the reference voltage by the light emission signal ESV to the end of the period PT2. If the voltage at the node N2 is lower than the reference voltage at the beginning of the period PT2, the micro light emitting diode (μ-LED) can emit light for the period PT2. Even if the voltage at the node N2 is equal to or higher than the reference voltage at the beginning of the period PT2, the micro light emitting diode (μ-LED) can emit light from when the voltage at the node N2 becomes lower than the reference voltage by the light emission signal ESV to the end of the period PT2. When the voltage at the node N2 is equal to or greater than a predetermined threshold, the voltage at the node N2 may be equal to or higher than the reference voltage even if the light emission signal ESV decreases. In this case, for the period PT2, the transistor T10 is maintained in the OFF state, and thus the micro light emitting diode (μ-LED) does not emit light. As described above, during the period PT1, depending on the voltage at the node N2 in each of the plurality of pixels PX, the light emission period of each pixel may vary. The exemplary embodiment may display the gray scale using a scheme of controlling the light emission period of each of the plurality of pixels PX.

Figure 7:
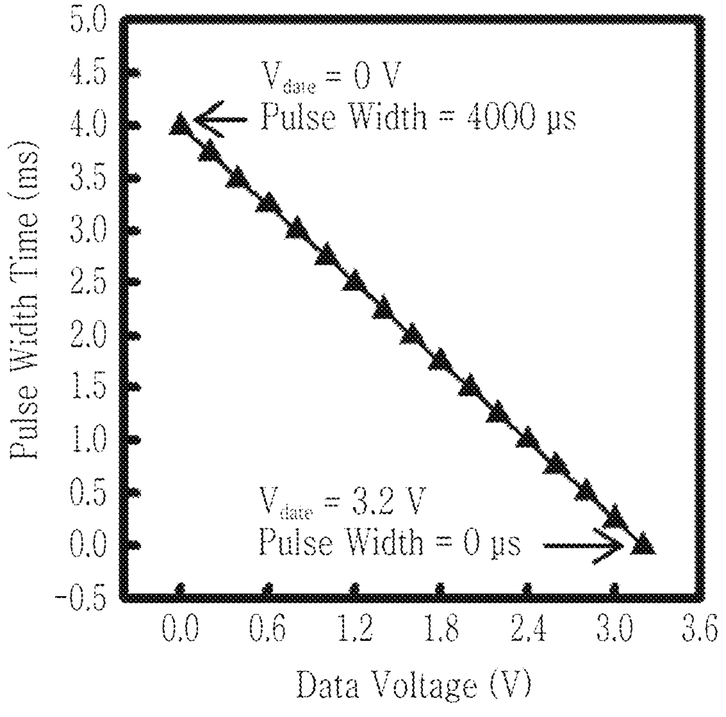
FIG. 7 is a graph illustrating a result obtained by simulating the light emission period according to data voltage with respect to the pixel circuit according to the exemplary embodiment.

FIG. 7 is a graph illustrating a result obtained by simulating the light emission period according to data voltage with respect to the pixel circuit according to the exemplary embodiment.

As shown in FIG. 7, data voltages Vdata may have a voltage range from 0 V to 3.2 V. A data voltage Vdata corresponding to the highest gray scale may be 0 V, and a data voltage Vdata corresponding to the lowest gray scale may be 3.2 V. In the graph of FIG. 7, a light emission period is indicated by a "pulse width time".

From FIG. 7, it can be seen that as the data voltage Vdata decreases, the voltage at the node N2 according to Expression 3 decreases, whereby the light emission period increases. Also, it can be seen that, conversely, as the data voltage Vdata increases, the voltage at the node N2 according to Expression 3 increases, whereby the light emission period decreases. As shown in FIG. 7, the light emission period (pulse width) corresponding to the highest gray scale may be 4000 μs, and the light emission period corresponding to the lowest gray scale may be 0 μs.

Figure 8:
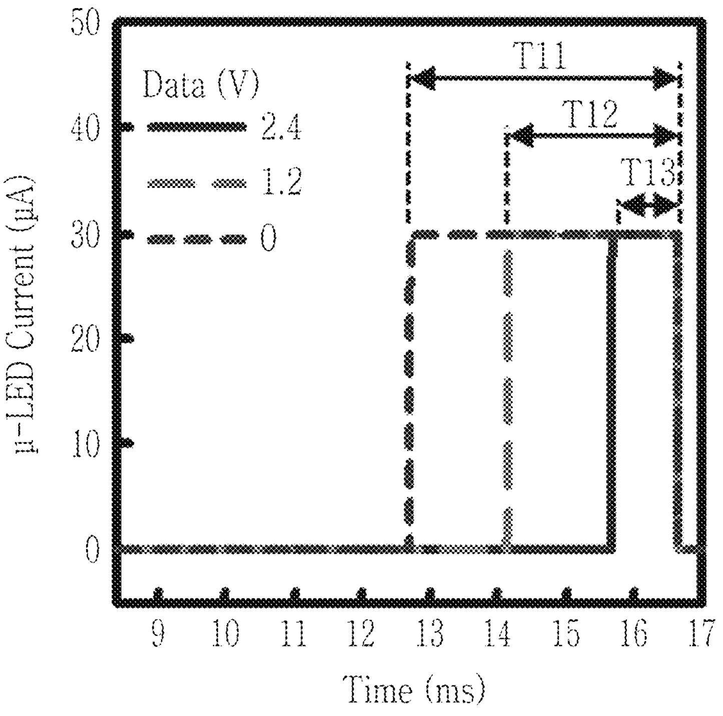
FIG. 8 is a graph illustrating a result obtained by simulating the period for which current flows in a micro light emitting diode according to data voltage with respect to the pixel circuit according to the exemplary embodiment.

FIG. 8 is a graph illustrating a result obtained by simulating the period for which current flows in a micro light emitting diode according to data voltage with respect to the pixel circuit according to the exemplary embodiment.

FIG. 8 shows a period T11 for which current flows in the micro light emitting diode (μ-LED) when the data voltage Vdata is 2.4 V, a period T12 for which current flows in the micro light emitting diode (μ-LED) when the data voltage Vdata is 1.2 V, and a period T13 for which current flows in the micro light emitting diode (μ-LED) when the data voltage Vdata is 0 V. It can be seen that as the data voltage Vdata decreases, the period for which current flows in the micro light emitting diode (μ-LED) increases.

Figure 9:
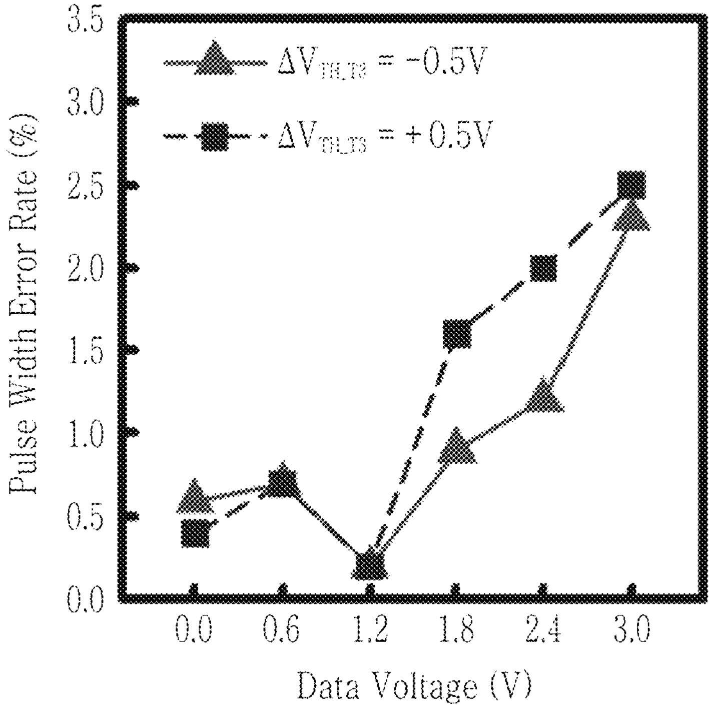
FIG. 9 is a graph illustrating a result obtained by simulating the influence of threshold voltage according to data voltage with respect to the pixel circuit according to the exemplary embodiment.

FIG. 9 is a graph illustrating a result obtained by simulating the influence of threshold voltage according to data voltage with respect to the pixel circuit according to the exemplary embodiment.

To show the influence of the threshold voltage of the transistor T3 according to each data voltage, the pulse width error rates (%) when the threshold voltage shift $\Delta V_{TH\_T3}$ of the transistor T3 was '−0.5 V' and when the threshold voltage shift was '+0.5 V' were derived through a simulation.

As shown in FIG. 9, when the threshold voltage shift $\Delta V_{TH\_T3}$ is '−0.5 V', the pulse width error rate is 2.4%, and when the threshold voltage shift $\Delta V_{TH\_T3}$ is '+0.5 V', the pulse width error rate is 2.5%. It can be seen that the pulse width error rate due to the threshold voltage deviations between the transistors T3 constituting the plurality of pixels is very low.

Figure 10:
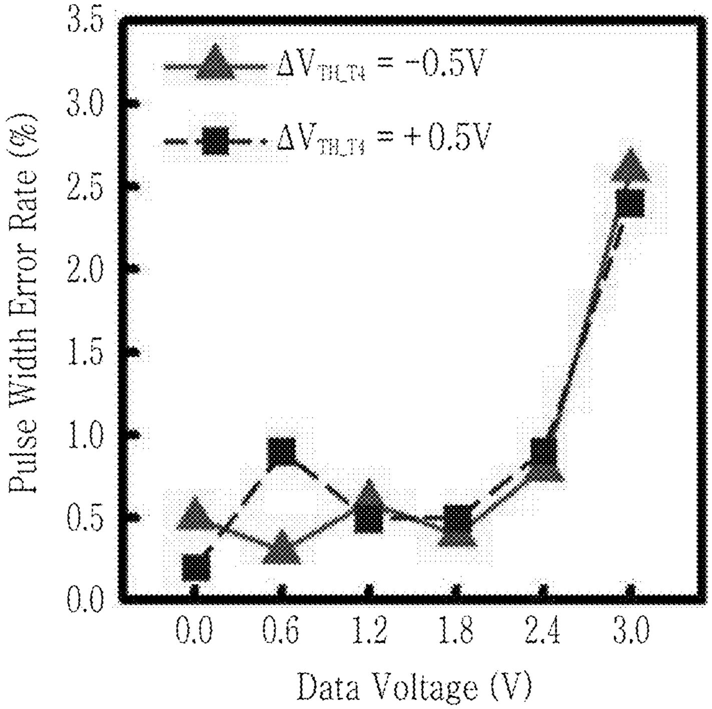
FIG. 10 is a graph illustrating a result obtained by simulating the influence of threshold voltage according to data voltage with respect to the pixel circuit according to the exemplary embodiment.

FIG. 10 is a graph illustrating a result obtained by simulating the influence of threshold voltage according to data voltage with respect to the pixel circuit according to the exemplary embodiment.

To show the influence of the threshold voltage of the transistor T4 according to each data voltage, the pulse width error rates (%) when the threshold voltage shift $\Delta V_{TH\_T4}$ of the transistor T4 was '−0.5 V' and when the threshold voltage shift was '+0.5 V' were derived through a simulation.

As shown in FIG. 10, when the threshold voltage shift $\Delta V_{TH\_T4}$ is '−0.5 V', the pulse width error rate is 2.6%, and when the threshold voltage shift $\Delta V_{TH\_T4}$ is '+0.5 V', the pulse width error rate is 2.4%. It can be seen that the pulse width error rate due to the threshold voltage deviations between the transistors T4 constituting the plurality of pixels is very low.

As such, the pixel circuit according to the exemplary embodiment may provide threshold voltage compensation to solve the problem of non-uniform brightness. Further, the rising period and falling period of drive current that is supplied to the micro light emitting diodes are shorter as compared to pixel circuits according to the related art. Accordingly, it is possible to solve a problem that the number of gray scale levels is limited due to the constraint of the light emission period when the gray scale is displayed in the pulse width modulation scheme. Particularly, since the rising period of the drive current according to the exemplary embodiment is short, the time required to express low gray scale may become shorter as compared to the related art. Then, the number of gray scale levels which can be displayed using micro light emitting diodes may increase as compared to the related art.

Figure 11:
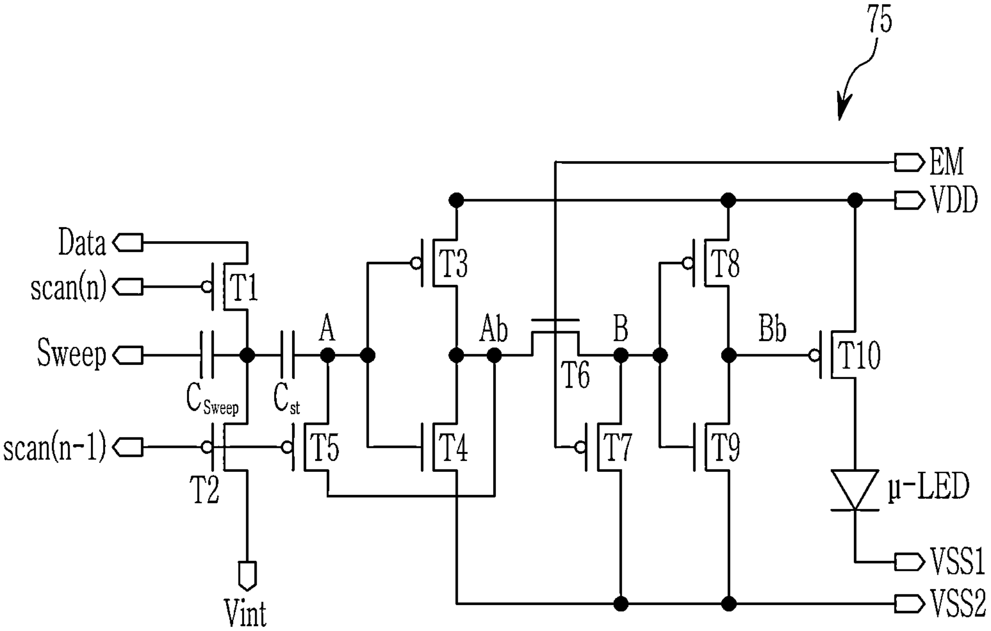
FIG. 11 is another example of the pixel circuit according to the exemplary embodiment.

FIG. 11 is another example of the pixel circuit according to the exemplary embodiment.

As compared to the pixel circuit shown in FIG. 5, the voltage which is supplied to the drain of the transistor T2 is different. The other components are identical to the components shown in FIG. 5. To the drain of the transistor T2, an initialization voltage Vint may be supplied. Before the data voltage based on the data signal vd[m] is applied to the node N1, the transistor T2 may be turned on by the previous scan signal scan[n−1], causing the initialization voltage Vint to be applied to the node N1.

The pixel circuit according to the present invention can be changed and expanded in various way like the pixel circuits 70 and 75.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A pixel circuit comprising:

a first transistor configured to provide a data signal to a first node according to a scan signal;

a second transistor configured to initialize the first node;

a first capacitor configured to be coupled between one terminal to which a light emission signal is provided and the first node;

a second capacitor configured to be coupled between the first node and a second node;

a third transistor configured to include a gate coupled to the second node and one terminal coupled to a third node;

a fourth transistor configured to include a gate coupled to the second node and one terminal coupled to the third node;

a fifth transistor configured to be coupled between the second node and the third node;

a drive transistor configured to include a gate to which a voltage corresponding to the voltage at the third node is supplied; and a micro light emitting diode configured to be coupled to the drive transistor, wherein the third transistor is a low-temperature polycrystalline silicon (LTPS) thin film transistor (TFT), and the fourth transistor is an oxide TFT.

2. The pixel circuit of claim 1, further comprising:

a sixth transistor configured to include one terminal coupled to the third node and another terminal coupled to a fourth node; and a seventh transistor configured to include one terminal coupled to the fourth node and another terminal to which drive voltage is supplied, wherein, to the gates of the sixth transistor and the seventh transistor, a light emission control signal for controlling light emission of the pixel circuit is provided, and the inverted voltage of the voltage at the fourth node is supplied to the gate of the drive transistor.

3. The pixel circuit of claim 2, wherein the seventh transistor is a low-temperature polycrystalline silicon (LTPS) thin film transistor (TFT), and the sixth transistor is an oxide TFT.

4. The pixel circuit of claim 2, further comprising:

an eighth transistor configured to include a gate coupled to the fourth node and one terminal coupled to a fifth node; and a ninth transistor configured to include a gate coupled to the fourth node and one terminal coupled to the fifth node, wherein the fifth node is coupled to the gate of the drive transistor.

5. The pixel circuit of claim 4, wherein the eighth transistor is a low-temperature polycrystalline silicon (LTPS) thin film transistor (TFT), and the ninth transistor is an oxide TFT.

6. The pixel circuit of claim 1, wherein when the fifth transistor is turned on, a voltage corresponding to the threshold voltages of the third transistor and the fourth transistor is stored in the second capacitor.

7. The pixel circuit of claim 6, wherein to the gate of the fifth transistor, a scan signal that transitions to an ON level prior to the scan signal is provided.

8. The pixel circuit of claim 1, wherein the light emission signal is at a first level when a data signal is written in the pixel circuit, and transitions from the first level to a second level after the data signal is written in the pixel circuit.

9. The pixel circuit of claim 8, wherein in a period when the light emission signal is at the first level, the fifth transistor is turned on, whereby the voltage corresponding to the threshold voltages of the third transistor and the fourth transistor is stored in the second capacitor.

10. A display comprising:

a display unit configured to include a plurality of pixels;

a scan driver configured to generate a plurality of scan signals and provide them to the plurality of pixels;

a data driver configured to generate a plurality of data signals and provide them to the plurality of pixels; and a light emission driver configured to generate a light emission control signal for controlling light emission of the plurality of pixels and a light emission signal and provide them to the plurality of pixels, wherein each of the plurality of pixels includes a low-temperature poly-Si oxide (LTPO) transistor implemented with a low-temperature polycrystalline silicon (LTPS) thin film transistor (TFT) and an oxide TFT, and a corresponding data signal that is provided to each pixel according to a corresponding scan signal, the threshold voltage of the LTPO transistor, and a voltage that is determined according to the light emission signal are provided to the gate of the LTPO transistor.

11. The display of claim 10, wherein each of the plurality of pixels includes the following:

a first transistor configured to provide a corresponding data signal to a first node according to a corresponding scan signal;

a second transistor configured to initialize the first node;

a first capacitor configured to be coupled between one terminal to which the light emission signal is provided and the first node;

a second capacitor configured to be coupled between the first node and a second node;

a third transistor configured to include a gate coupled to the second node and one terminal coupled to a third node;

a fourth transistor configured to include a gate coupled to the second node and one terminal coupled to the third node;

a fifth transistor configured to be coupled between the second node and the third node;

a drive transistor configured to include a gate to which a voltage corresponding to the voltage at the third node is supplied; and a micro light emitting diode configured to be coupled to the drive transistor, and the third transistor is a low-temperature polycrystalline silicon (LTPS) thin film transistor (TFT), and the fourth transistor is an oxide TFT, and the LTPO transistor includes the third transistor and the fourth transistor.

12. The display of claim 11, wherein the pixel circuit further includes the following:

a sixth transistor configured to include one terminal coupled to the third node and another terminal coupled to a fourth node; and a seventh transistor configured to include one terminal coupled to the fourth node and another terminal to which drive voltage is supplied, and to the gates of the sixth transistor and the seventh transistor, the light emission control signal is provided, and the inverted voltage of the voltage at the fourth node is supplied to the gate of the drive transistor.

13. The display of claim 12, wherein the seventh transistor is a low-temperature polycrystalline silicon (LTPS) thin film transistor (TFT), and the sixth transistor is an oxide TFT.

14. The display of claim 12, wherein the pixel circuit further includes the following:

an eighth transistor configured to include a gate coupled to the fourth node and one terminal coupled to a fifth node; and a ninth transistor configured to include a gate coupled to the fourth node and one terminal coupled to the fifth node, and the fifth node configured to be coupled to the gate of the drive transistor.

15. The display of claim 14, wherein the eighth transistor is a low-temperature polycrystalline silicon (LTPS) thin film transistor (TFT), and the ninth transistor is an oxide TFT.

16. The display of claim 11, wherein when the fifth transistor is turned on, a voltage corresponding to the threshold voltages of the third transistor and the fourth transistor is stored in the second capacitor.

17. The display of claim 16, wherein to the gate of the fifth transistor, a scan signal that transitions to an ON level prior to the corresponding scan signal is provided.

18. The display of claim 11, wherein the light emission signal is at a first level when the plurality of data signals is written in the plurality of pixels, and transitions from the first level to a second level after the plurality of data signals is written in the plurality of pixels.

19. The display of claim 18, wherein in a period when the light emission signal is at the first level, the fifth transistor is turned on, whereby the voltage corresponding to the threshold voltages of the third transistor and the fourth transistor is stored in the second capacitor.

* * * * *